(12) United States Patent
Khabiri et al.

(10) Patent No.: US 12,008,028 B2
(45) Date of Patent: Jun. 11, 2024

(54) MINING LOCATIONS AND OTHER CONTEXT INFORMATION FROM CONSTRUCTION DOCUMENTS

(71) Applicant: International Business Machines Corporation, Armonk, NY (US)

(72) Inventors: Elham Khabiri, Briarcliff Manor, NY (US); Pietro Mazzoleni, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 16/174,757

(22) Filed: Oct. 30, 2018

(65) Prior Publication Data

US 2020/0133970 A1 Apr. 30, 2020

(51) Int. Cl.
| | | |
|---|---|---|
| *G06F 16/36* | (2019.01) | |
| *G06F 16/387* | (2019.01) | |
| *G06F 40/30* | (2020.01) | |
| *G06N 5/046* | (2023.01) | |
| *G06V 30/422* | (2022.01) | |

(52) U.S. Cl.
CPC .......... *G06F 16/367* (2019.01); *G06F 16/387* (2019.01); *G06F 40/30* (2020.01); *G06N 5/046* (2013.01); *G06V 30/422* (2022.01)

(58) Field of Classification Search
CPC ...... G06F 16/367; G06F 16/387; G06F 40/30; G06K 9/00442; G06K 9/00476; G06N 5/046
See application file for complete search history.

(56) References Cited

U.S. PATENT DOCUMENTS

| | | | |
|---|---|---|---|
| 7,058,623 B2 | 6/2006 | Wong | |
| 2003/0208342 A1* | 11/2003 | Jung | G06F 30/00 703/1 |
| 2008/0247636 A1* | 10/2008 | Davis | G09G 5/00 382/152 |
| 2012/0072386 A1* | 3/2012 | Willems | G06N 5/04 706/47 |
| 2012/0084323 A1* | 4/2012 | Epshtein | G06F 16/9537 707/E17.014 |
| 2018/0260513 A1* | 9/2018 | Dweik | G06F 30/20 |
| 2019/0050639 A1* | 2/2019 | Ast | G06N 3/08 |

FOREIGN PATENT DOCUMENTS

| | | |
|---|---|---|
| CN | 103617247 B | 8/2016 |
| EP | 2 923 333 B1 | 7/2017 |
| EP | 3 104 302 B1 | 5/2018 |

OTHER PUBLICATIONS

Mel, et al. "The NIST Definition of Cloud Computing". Recommendations of the National Institute of Standards and Technology, Nov. 16, 2015.

* cited by examiner

*Primary Examiner* — Irete F Ehichioya
*Assistant Examiner* — Xiaoqin Hu
(74) *Attorney, Agent, or Firm* — Michael O'Keefe (57) ABSTRACT

A method of processing construction documentation includes receiving, as input data into a processor of a computer, a document directed to a specific construction project as input data. The processor extracts location and context information from the document. The location information defines locations relevant to the specific construction project and the context information comprises text extracted from image data of the document.

13 Claims, 9 Drawing Sheets

MINING LOCATIONS AND OTHER CONTEXT INFORMATION FROM CONSTRUCTION DOCUMENTS

BACKGROUND

The present invention relates generally to artificial intelligence (AI) data mining and, more specifically, a computer solution platform providing an analytics services library is utilized to extract location and context information from construction engineering documents based on location data, cognitive searches using a natural language engine, and advanced analytics used on construction documents.

SUMMARY

According to an exemplary embodiment, the present invention discloses a method (and structure and computer product) for a method of processing construction documentation, including receiving, as input data into a processor of a computer, a document directed to a specific construction project as input data; and extracting, using the processor, location information and context information from the document, wherein the location information defines locations relevant to the specific construction project and the context information comprises text extracted from image data of the document.

Also described herein is a method (and structure and computer product) of processing construction documentation, including using at least one industrial standard to develop an ontology and a taxonomy as defining a domain of construction documents to be used for processing all documents directed to a specific construction project, the ontology comprising a set of concepts and categories in the domain that shows their properties and interrelationships and the taxonomy comprising a common vocabulary to be used for terms found in all the documents directed to the construction project; training a learning model, using a processor on a computer, to extract location information and context information from documents, using the developed ontology and taxonomy such that extracted text comprising the context information is semantically related to said taxonomy; applying the trained learning model to all documents directed to the construction project; and upon completion of applying the trained learning model, storing each document in a database of documents directed to the construction project, each document being stored as annotated with its extracted location and context information.

Also described herein is a method (and structure and computer product) of processing construction documentation, including receiving input data as a data-dump of one or more 3D models of a construction project and corresponding architecture and an overall layout for the construction project; providing information from the input data as an input into an analytical model which will automatically infer grid coordinates in data directed to the construction project even when grid coordinates in an engineering document are obscured by other content in an engineering document.

DETAILED DESCRIPTION

Figure 1:
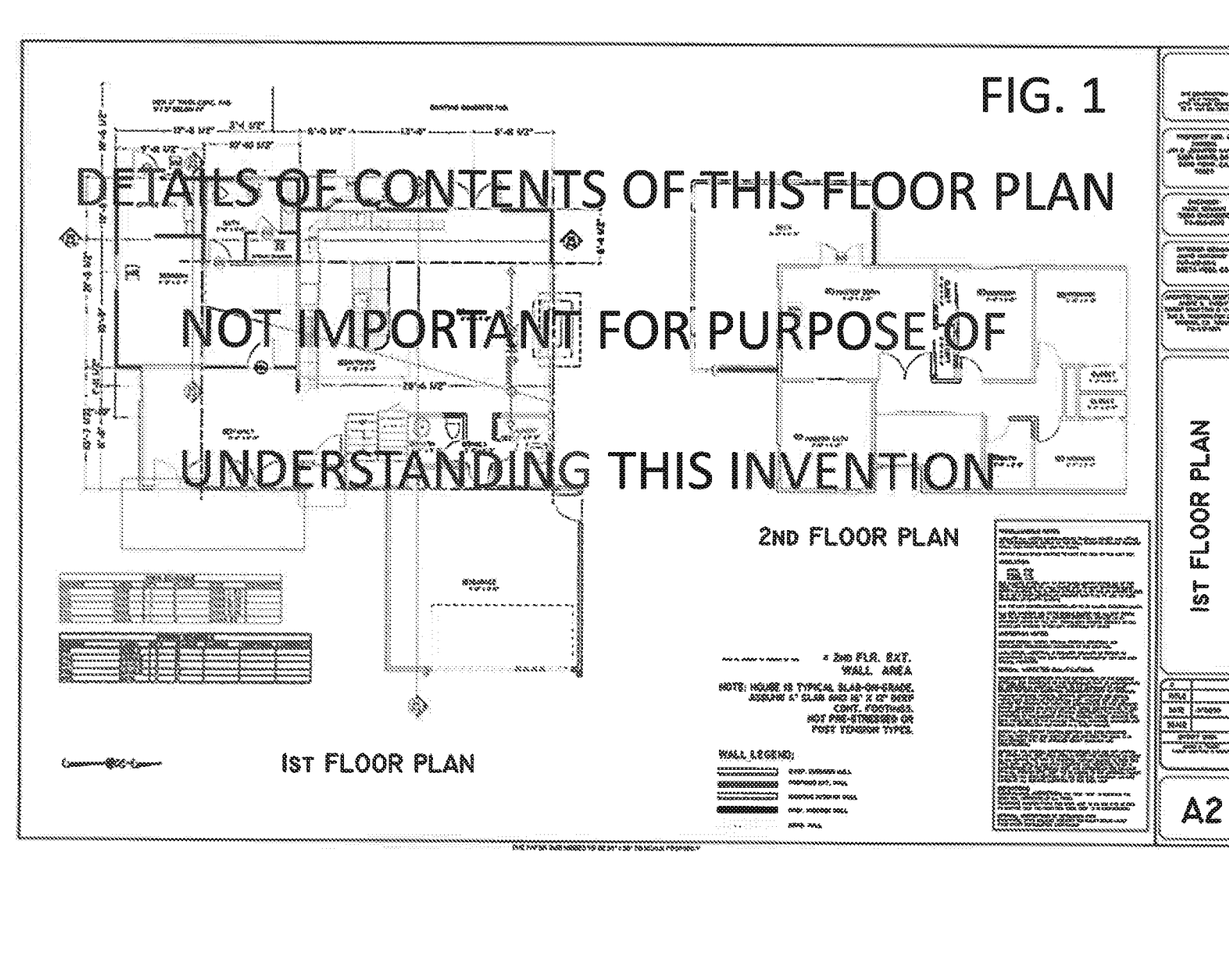
FIG. 1 exemplarily shows an engineering document.
Figure 2:
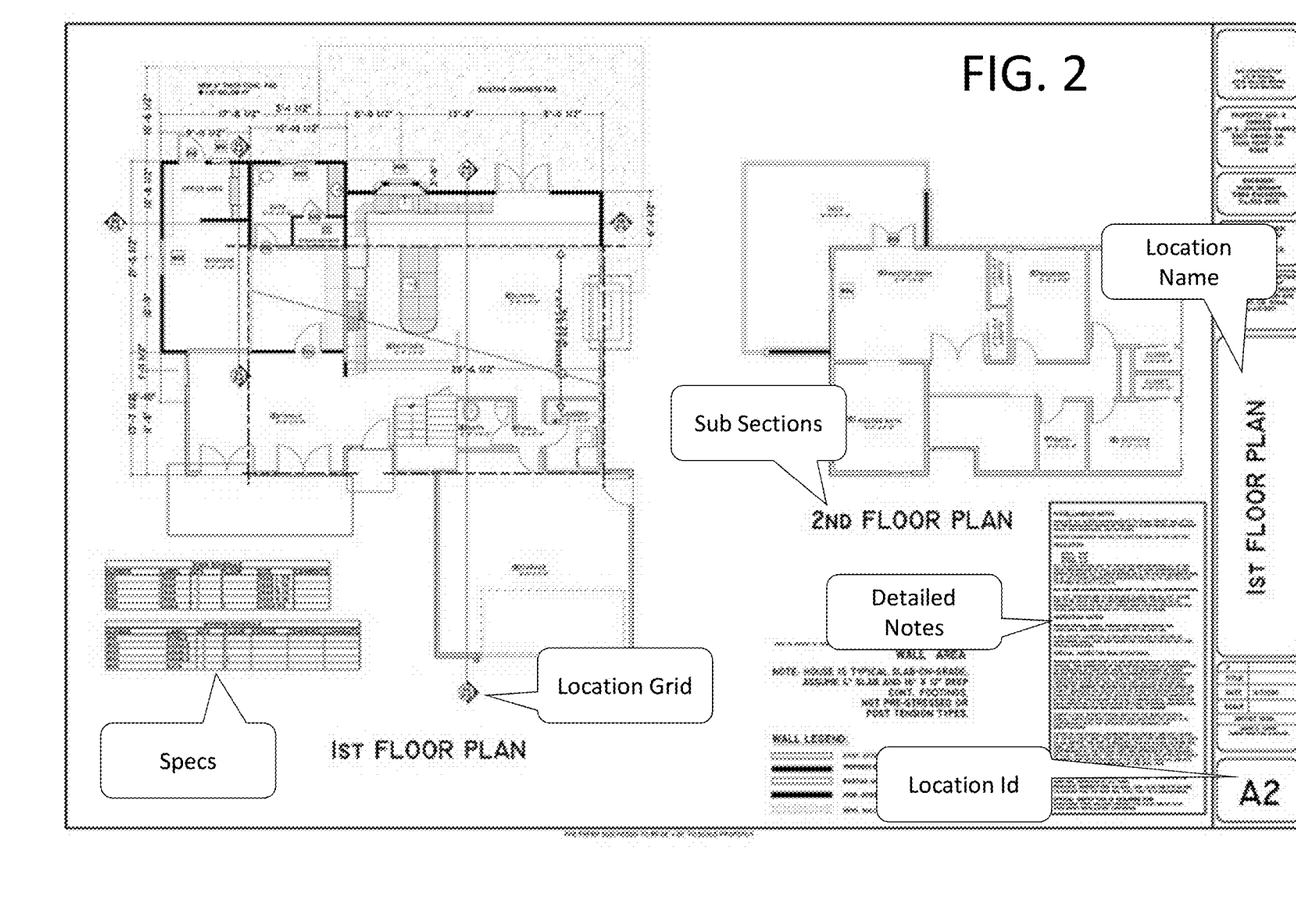
FIG. 2 shows various types of information typically provide in the exemplary engineering document of FIG. 1.

With reference now to FIG. 1, the present invention provides a computer AI platform tool for discovering locations in engineering documents. Engineering documents such as exemplarily shown in FIG. 1 as a reduced-size architectural floor plan drawing, are drawings, shop drawings, plans, specifications, etc., associated with an engineering or construction project. As a group of documents, such construction documents include detail location information and every important element of a building to be completed. As shown exemplarily in FIG. 2, the architectural floor plan drawing of FIG. 1 might include portions for location name and location identification, detail notes, and specs, as well as indicating subsection information and location grids. Because of the reduced size of this exemplary architectural floor plan drawing in FIGS. 1 and 2, the actual information of these two figures is not important for purpose of understanding the present invention.

The problem being addressed by the present invention is that engineering projects might include thousands of design documents. These documents come from different companies (e.g., contractor(s), suppliers, manufacturers, subcontractors, or fabricators, etc.), provide different levels of details and each document pertains only to certain tasks of the project. Particularly when there are many documents, engineers, as well as other technical workers, have difficulty finding which documents are most relevant based on their location, job role, or assigned activity.

Moreover, there are numerous business challenges during a construction project. For example, an engineer might need to know which engineering documents are relevant to her specific task, job role, location, or project status. Business users have an interest in using a natural language to submit queries to find relevant documents such as, for example, "Tell me all documents with 'water fountain' in this building." Another challenge is that of quickly assessing if a building is compliant with one or more requirements in design documents.

There are also numerous technical challenges involved with the construction documents themselves. For example, such documents for a project can span from one to hundreds of pages. Each vendor typically uses slightly different templates for their documents. There might not be direct mapping between a three-dimensional (3D) building model and engineering documents. Finally, only a small subset of information can be captured in a filename and metadata for an electronic document.

The present invention provides an artificial intelligence (AI) platform that solves these construction documentation problems and provides a computer-based tool that greatly enhances easy access of relevant location information to personnel working on a construction project.

Figure 3:
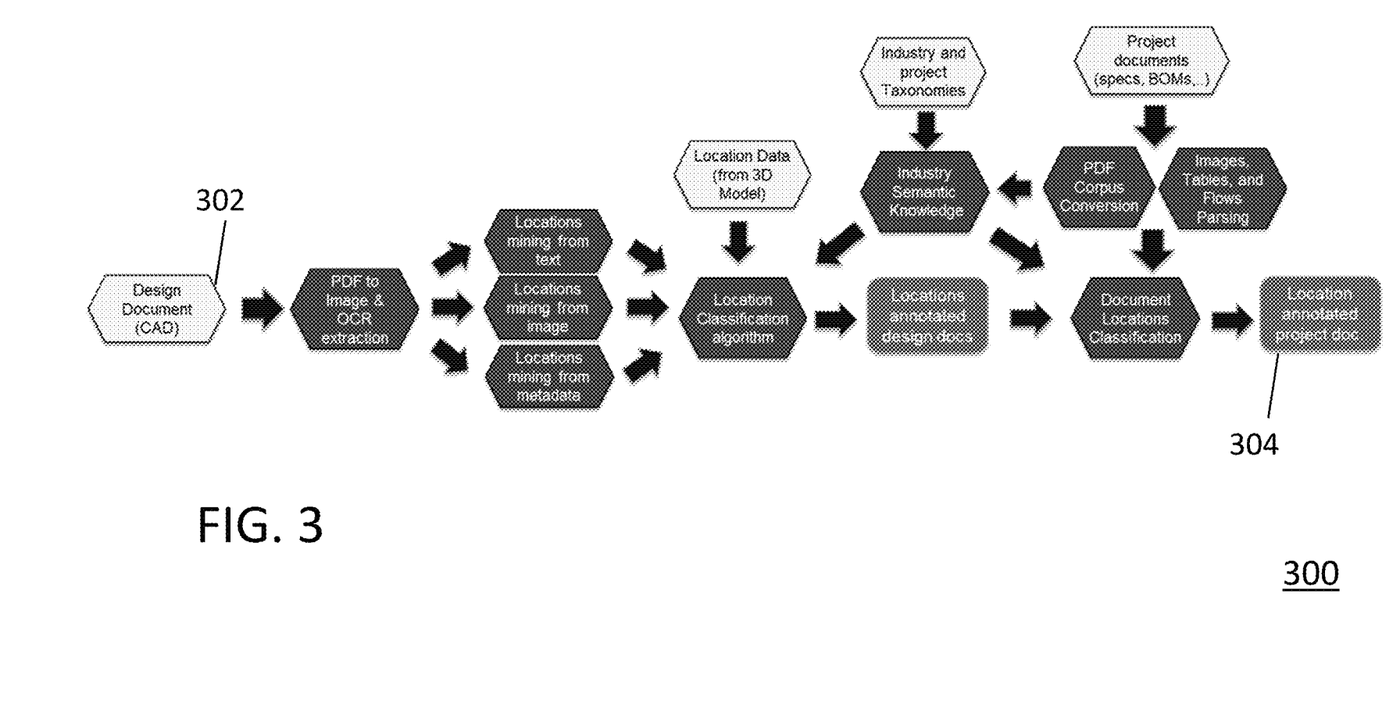
FIG. 3 shows in summary format how the present invention provides annotated location information from engineering documents.

As exemplarily shown in FIG. 3, input data 302 available for use by the tool 300 of the present invention include any number and variety of construction engineering design documentation, such as computer-aided design (CAD) documents for a specific construction project. Depending upon the specific construction requirements, other non-limiting examples of project construction documentation could include, for example, shop drawings, bill-of-material (BOM) documents, finish documents, electrical wiring and plumbing diagrams, 3D building model information, company location data, etc. Output data 304 is stored in a database containing location annotated construction documents for each construction project. This construction project documents can then be accessed and searched using input queries constructed from natural language input messages from a user.

Relative to various related conventional methods, the present invention provides a number of new and useful features.

For example, one conventional system creates tagged representations of model building engineering codes that reflect the logic and requirements of the codes from the text of the codes. This conventional system focuses on compliance mapping using the engineering documents but does not use information in the images. In contrast, the present invention automatically extracts information in images of computer-aided design (CAD) documents so that such information is accessible by a user using natural language interface engine for search queries.

Another conventional system manipulates document files including engineering building drawings. This conventional system stores document drawings in a computer memory, selectively displays a drawing, electronically selects at least two measuring points on the drawing, and can automatically determine a measured quantity represented by measuring points scaled to the full-scale dimensions. This conventional system purely processes image information, ignoring the semantic information of text found in or near the image data. In contrast, the present invention automatically makes sense of the text appearing in a drawing beside an image, using an appropriate industry taxonomy and making such text available for searches by a user using a natural language interface.

In another conventional system, functional knowledge is leveraged by a design tool in an engineering project that includes a functional knowledge repository created by modeling of requirements of the engineering project and space planning tool interfacing between the functional knowledge repository and the design tool. This conventional method maps the given requirements with a single design document. In contrast, the present invention retrieves relevant information from potentially large numbers of given documents, using the image and text information found in the engineering documents and makes such text and image information available for searches by a user using a natural language interface.

Another conventional system provides probabilistic matching of text using optical character recognition (OCR) but fails to provide capability to learn the context of extracted terms. In contrast, the present invention matches ambiguous terms to the closest domain-related vocabulary, using vocabulary derived as being taxonomy for the domain and similar contextual information using a knowledge graph that reflects the ontology of the domain.

Another conventional system identifies symbols and text found in engineering documents but fails to learn context of text using domain knowledge obtained by using semantic mapping to the domain taxonomy. In contrast, the present inventor recognize that identification of text and symbols is not always sufficient and that documents need to be tagged by relevant concepts that may not be found in the engineering document. Having images beside text often makes realization of the text ambiguous, so there is a need to discover what the term is about, using domain knowledge.

Yet another conventional system uses a method in which text patterns are all predefined, meaning that much time must be spent to capture the relevant vocabularies used in the engineering documents. The present inventors recognize that this method is not scalable and not practical when the number of documents is growing, with diverse ways of calling different objects with similar terms. In contrast, since it is not practical to have predefined textual information that covers all terms mentions across many documents, there is a need to automatically learn the domain terms as encountered in many different construction documents. The present invention achieves this by expanding the online-available taxonomy and using it to recognize text that is encountered in many different construction documents.

The computer tool of the present invention uses artificial intelligence (AI) techniques to extract location information from engineering documents, as requested by a user. Such location information can be used for documents retrieval based on global positioning system (GPS) coordinates, indoor positioning system (IPS) coordinates, cognitive searches using a natural language search engine, and advanced project analysis. This method provides the capability to infer physical locations and context information from engineering design documents where such information is not available either as document metadata or directly available from 3D model data. Thus, as used in the context of the present invention, the term "context information" refers to information from engineering documents that is not available as document metadata or directly available from 3D model data, and typically includes text data that has been converted from image data of documents using optical character recognition (OCR) analytics.

As part of the analysis of the present invention, input data is received, such as a data dump of 3D models related to a specific project and corresponding architecture design documents indicating grid coordinate references and overall layout of the project. Such input information is input into the analytical model of the present invention, which will automatically infer grid coordinates even when coordinates are obscured by other content in the engineering document. This analytical model utilizes existing image and optical character recognition (OCR) analytics as extended into the domain of construction engineering documentation and as modified to resolve ambiguity by using a taxonomy derived for that domain.

Further, as also part of the analysis of the present invention, taxonomies of a specific project or of industry standards such as from the Construction Specifications Institute (CSI). These taxonomies are used in the analytical model of the present invention to semantically search textual context within specific areas of an engineering document and then tie such textual context with information from the 3D model data and/or other project materials such as bills of material or specifications for the project.

There are many potential applications of the tool provided by the present invention. For example, a worker could use it for a real-time document retrieval, using their mobile device, to present documents relevant to his/her profile and present IPS (Indoor Positioning System) coordinates, using a hotspot or beacon or other Internet of Things (IOT) device to interface with the tool of the present invention.

In another example, an augmented reality application of the present invention overlays elements from the building, such as fixtures, with the information specification defined in the engineering documents. In real-time and by simply pointing a mobile device to a location of the building, the system will be able to recognize risks and run high-level project compliance analysis.

In yet another non-limiting example, the present invention could serve as a virtual assistant. For example, while working on a project, a seller could use natural language to ask for documents including a given location and/or other characteristics of the problem related to the construction project. As part of the result, only relevant pages will be returned and relevant location information dynamically highlighted in the document. When connected to a printing device, such virtual assistant could automatically generate a hard-coded copy of an engineering document personalized to each worker and their respective specific tasks.

From these several examples, many other applications of the present invention should be apparent to one having ordinary skill in the art.

In a preferred exemplary embodiment, the AI tool of the present invention shown in FIG. 3 is an application implemented as a pipeline for engineering documents on an analytics solution platform, meaning a computer-based platform having various analytic tools that can work together in the manner described herein. One such analytics solution platform, for example, is IBM's cloud-based SROM (Smarter Resource and Operations Management) platform system, as used to implement the prototype system of the present invention. However, it should be clear that the present invention is not limited to this single analytics solution platform. In the context of the present invention, a "pipeline" refers to a series of computing processes conceptually executed concurrently and/or sequentially, with an output of one process possibly be fed automatically into the input stream of another process. In the present invention, the pipeline comprises various processes related to engineering documents, including at least: extracting relevant areas containing text by using image analytics, running Natural Language Processing (NLP) for conceptualizing the extracted text, based on industry-standard and project-specific taxonomies, and using regression algorithms to detect grid coordinates.

The analytics are powered by various advanced algorithms, are cataloged based on a comprehensive ontology, and guide common users through specific workflow with pre-engineered application programming interfaces (APIs), data structures, and graphical user interface (GUI) widgets for visualizing input data and output solutions. Although the term "algorithm" is used herein, such word choice is not intended as referring to any fundamental mathematical algorithm per se. Rather, the word "algorithm" is intended to refer generally to any processing that includes various underlying mathematical steps and processes to provide a processing module adapted to achieve various functions in the context of the present invention. Examples of the advanced algorithms used in the present invention include, for object detection, CNN (Convolutional Neural Network) and Region-based Convolutional Network and, for text detection, a Deep Learning-based LSTM (Long Short-Term Memory) engine and an OCR (Optical Character Recognition engine.

The ontology of the present invention can be built based on industry standards, such as, for example, the CSI MasterFormat standard, which provides a basis for parts of some of the algorithms to extract contextual information. For clarification, the word "ontology", as used herein, refers to a set of concepts and categories in a subject area or domain that shows their properties and interrelationships. Every field in computer science and information science creates an ontology to limit complexity and to organize information into data and knowledge. In the case of the present invention, the domain of interest is construction documentation and the ontology of this domain is based upon industry standards such as CSI MasterFormat. CSI MasterFormat is a publication, available online, of the Construction Specifications Institute (CSI) that is used to organize project manuals and detailed cost information and to relate drawing notations to specifications. Other construction-related standards, such as, for example, ISO (International Organization for Standardization) standard ISO 14224:2016 concerning the oil and gas industry, could also provide information for developing the ontology underlying the present invention if the CSI MasterFormat should be insufficient for taxonomy of terms in a specific construction project.

An analytics services platform that underlies the present invention integrates a business solution library with state-of-the-art algorithms for solving problems in the area of resource and operations management by incorporating analytics and engines specifically designed to extract locations and other meaningful information from engineering documents that are located in a database library storing engineering documents related to a specific project. Because it is implemented on an analytics services platform such as the SROM platform, the pipeline of the present invention offers a unique ensemble of image, text, and statistical analytics that leverages industry standards such as CSI MasterFormat. However, it is again noted that the ensemble of analytic tools and engines of the present invention is independent of any specific analytic services platform such as SROM. Another important aspect of the present invention is the incorporation of a natural language processing (NLP) module that is part of a user interface permitting convenient user interactions since NLP processing used in the present invention has been adapted to correlate documentation text with construction industry taxonomy terms.

Figure 4:
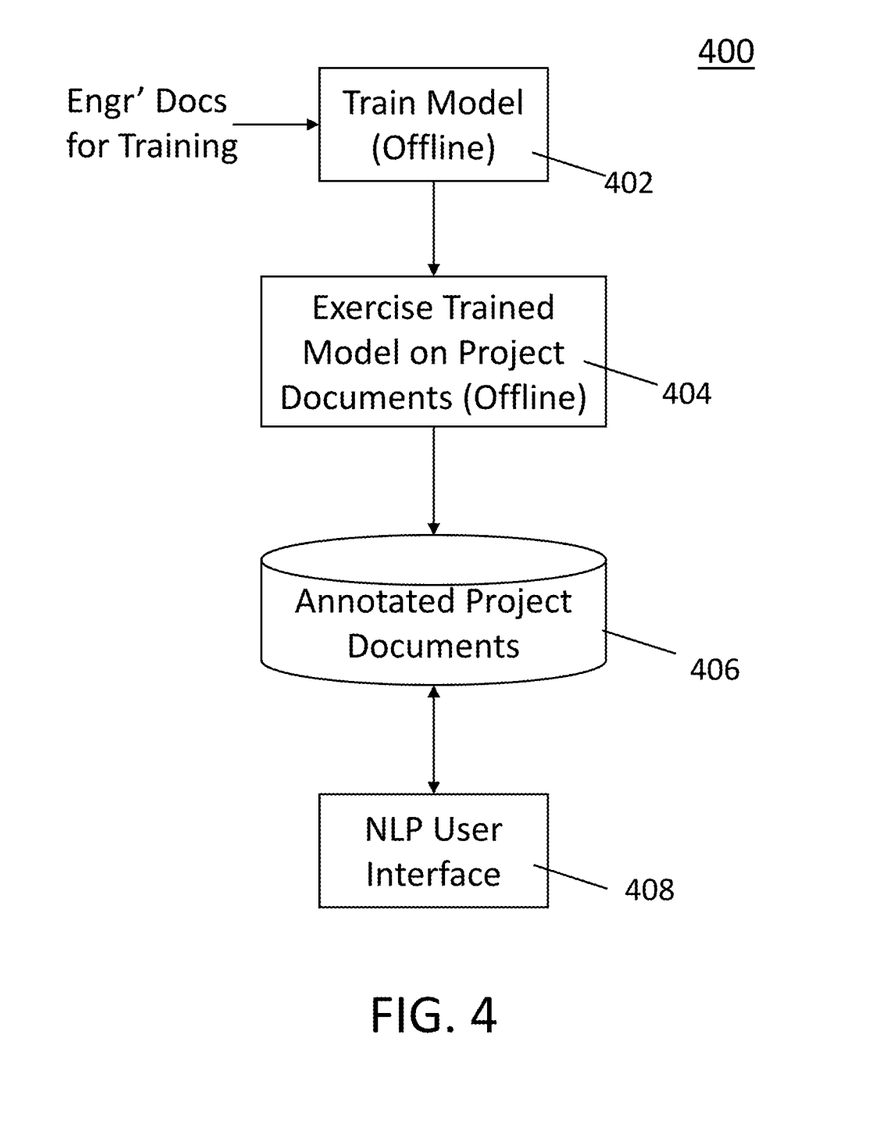
FIG. 4 shows in flowchart format the sequence of modeling underlying the present invention.

In a preferred embodiment, the method for modeling of the present invention can exemplarily be summarized as having three steps, as shown in FIG. 4. In an offline stage 402, a model is trained with sample engineering documents for object detection and for text detection. This initial training can involve crossing over into multiple construction projects since multiple projects can be based on the same initial model.

In a second offline stage 404, the initial model is scored and annotated based on semantics. In this second stage, each project's documents, including those documents not used for training of the initial model are applied to the initial model. The second stage also includes annotation based on industry standards such as CSI MasterFormat. The results and annotations of this second stage are returned to that project's database, along with the original documents.

In the third stage 406, the database for each construction project, as having been exercised by the processing of the second stage 404, is now available to users for searching on-the-fly, including searches based on input queries that use natural language processing.

The summary shown exemplarily in FIG. 3 actually shows three primary components of the engineering documentation pipeline of the present invention, which will now be described in more detail as including a location hypothesis extraction component shown in FIG. 5, a location semantics classifier component shown in FIG. 6, and a location context mining component shown in FIG. 7. These three components 302, 304, 306 are actually ensembles of analytics pieced together to form the engineering documents pipeline of the present invention.

The Location Hypothesis Extraction Component

Figure 5:
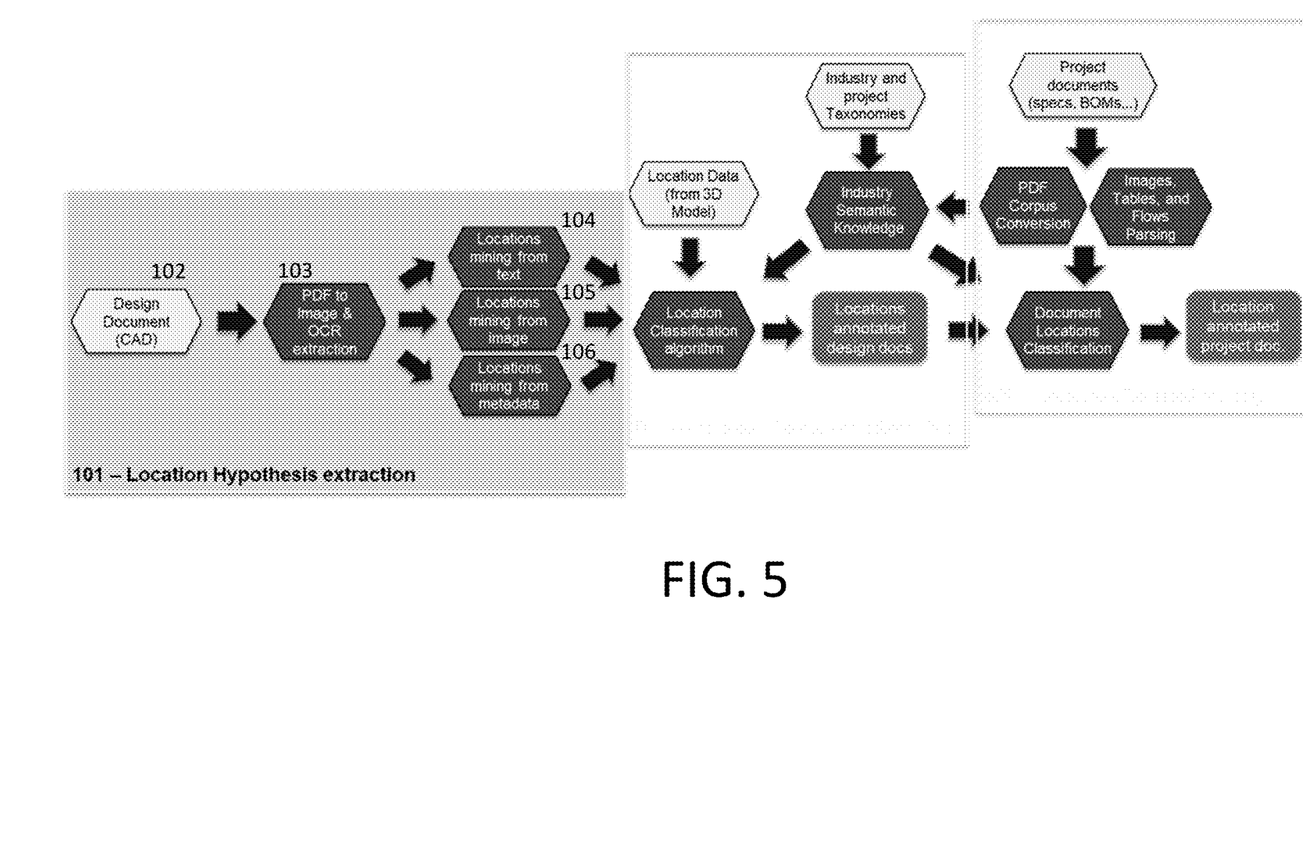
FIG. 5 shows the first of three primary components of the engineering documents pipeline of the present invention

The location hypothesis extraction component shown in FIG. 5 extracts location information from engineering documents by analyzing file names, file metadata, and file content to mine valuable location information. In analyzing the file content, the analytics can be run at either or both of page-level and document-level (cross-page) granularity. Valuable location information includes, but is not limited to, the document legend, general notes, sub-section information, or grid locations coordinates.

In the location hypothesis extraction component 302, an engineering document, such as a CAD (computer-aided design) design document, is received as input data in step 102 and, in step 103, converted from PDF into an image. Subsequent processing in steps 104, 105, 106 permit location data to be mined from text, images, and metadata. Optical Character Recognition (OCR) can be used to extract text from image data.

The present invention additionally leverages image, text, and statistical analytics by implementing machine learning techniques as trained on publicly available knowledge. Two main approaches are taken for the machine learning.

First, in a semi-supervised approach, a user provides an input area(s) (e.g., top left corner) of where to search for location information for documents, following a given template such as from a given design company. As part of this template-based approach, existing explore/exploit techniques such as GAN (generative adversarial networks) can be used to generalize the solution to work across different variations of the same document template. It is noted that GAN is a class of AI algorithms in which two neural networks contest each other in a zero-sum game format. One network generates candidates (generative) and the other network evaluates them (discriminative).

Second, in an unsupervised approach, existing unsupervised machine learning and deep learning techniques, such as a convolutional neural network (CNN) or a region-based convolution network, are applied to mine information from a document without any additional inputs from a user. It is noted that CNN is commonly applied in visual recognition problems.

A main challenge for engineering documentation was training the system to detect underline grid coordinates described in models. Different machine learning models can be used to detect different type of grid patterns, such as radial grids and modular grids. In detecting grids, additional regressions analytic steps were added to the process to leverage radial or modular nature of grids coordinates.

The Location Semantic Classifier Component

Figure 6:
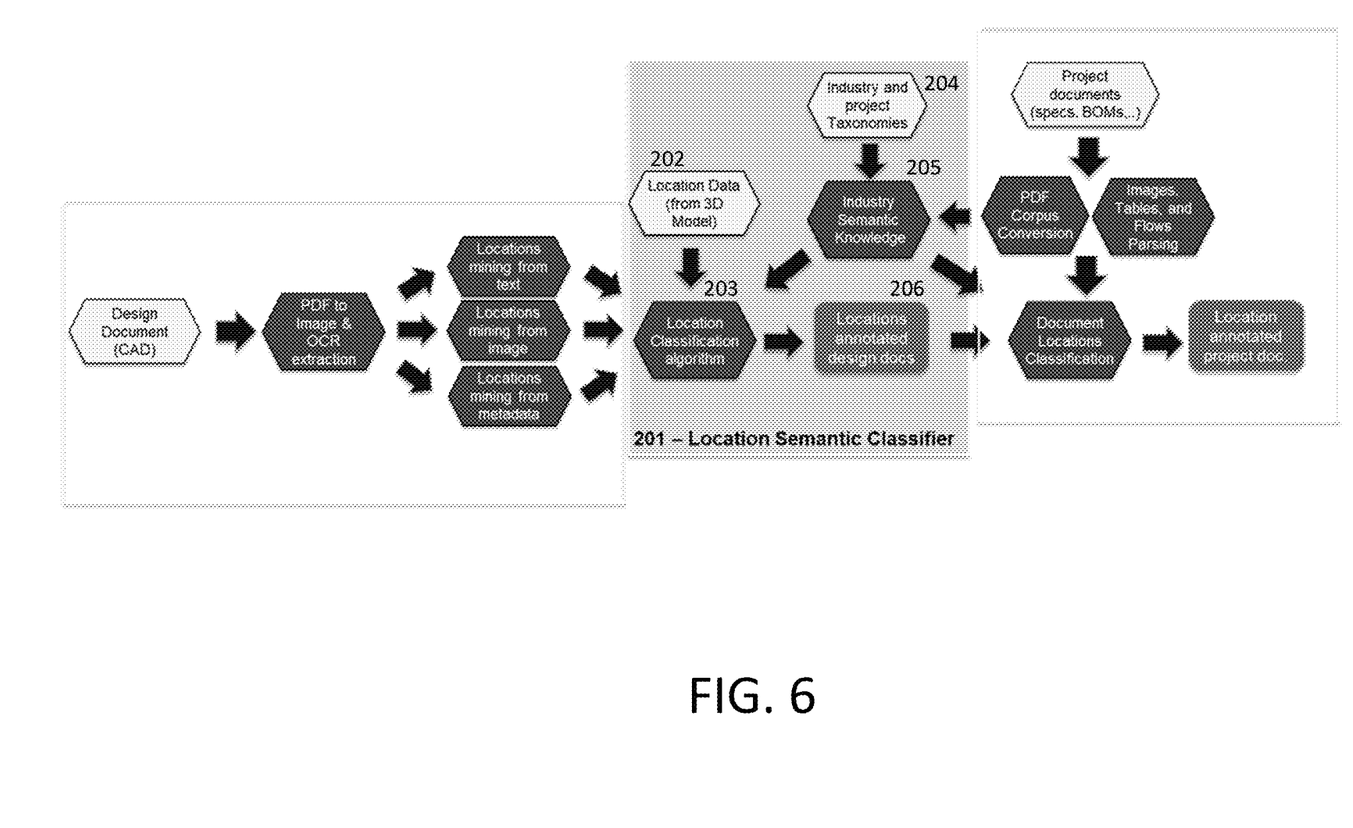
FIG. 6 shows the second component of the pipeline.
Figure 7:
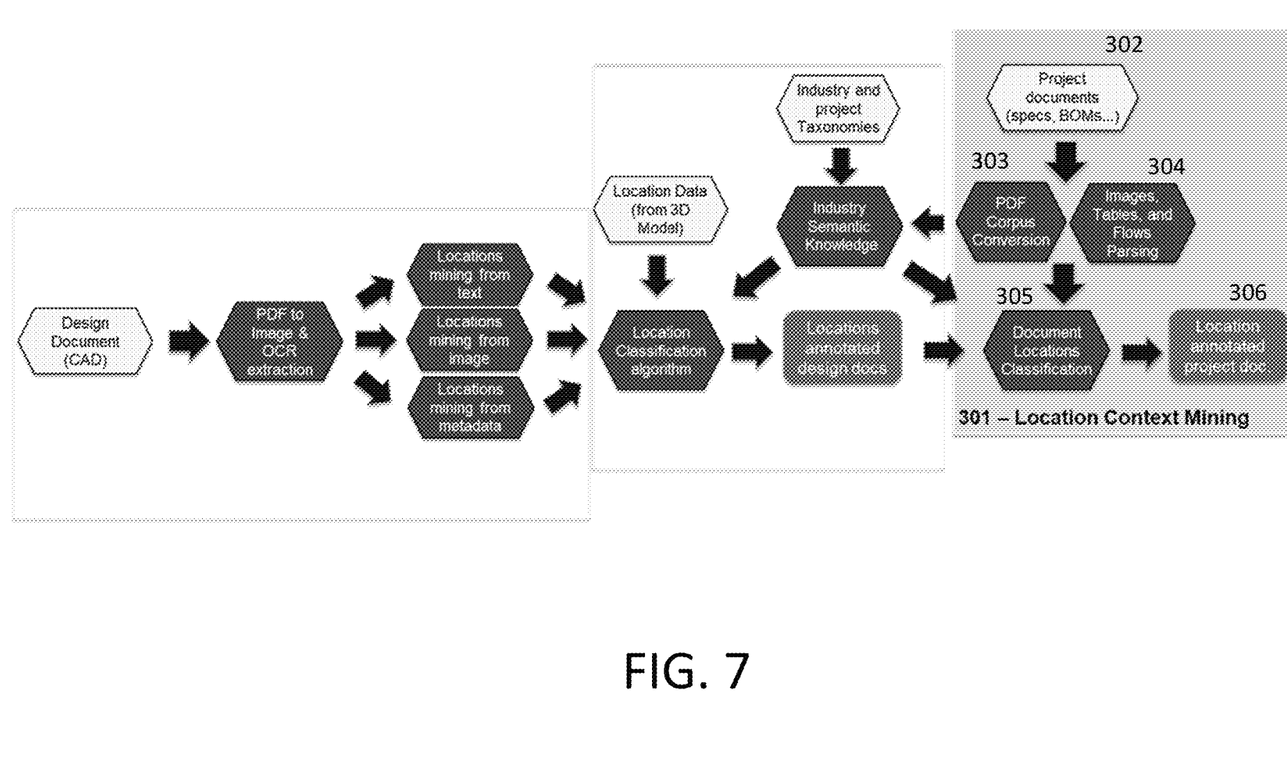
FIG. 7 shows the third component of the pipeline.

The output data 104, 105, 106 of the location hypothesis extraction component 101 are passed into the location semantic classifier component 201 shown in FIG. 6. Alternative data sources for the location semantic classifier 201 are location data from a 3D model 202 and location data from industry taxonomies 204, such as the CSI MasterFormat, that provides a master list of numbers and titles classified by work results and is primarily used to organize project manuals and detailed cost information and to relate drawing notations to specifications. Thus, the CSI MasterFormat is one example of industry semantic knowledge 205. Another possible example is ISO 14224:2016 Petroleum, Petrochemical and Natural Gas Industries—Collection and Exchange of Reliability and Maintenance Data for Equipment, and other industrial standards could be used for such taxonomy data. A location classification algorithm 203 will resolve conflicts and mine missing information.

One exemplary classification algorithm adopted for the present invention is an E2E (End-to-End) analytic algorithm which is designed to leverage specific characteristics of the document. E2E deep learning is a technique used, for example, in transcribing audio, image captioning, machine translation, image synthesis, and other applications for which a lot of data exists. E2E consists of outputting more complex data structures rather than many presentations of simple data items.

As an example, the system is trained to understand, among others, the notions of location grid reference frame and floor. In this context, the right grid references in a document can be found even if some of the coordinates are hidden by other elements of the drawing. To achieve this, the algorithm will interpolate visible information such as existing coordinates in the current drawing or coordinates mined from drawings of other floors.

Similarly, location information from an industry semantic model is used as input to detect contextual information such as which construction discipline (e.g. piping, electrician, etc.) based on the unstructured text such as general notes in the engineering document. The industry taxonomy 204 is used to semantically correlate information in the engineering document, such as General Notes, with context that is relevant to the domain of that engineering document. This information can be used across engineering documents for that project or even outside engineering documents. For example, part ordering information can be connected to the engineering documents for a project.

An existing natural language processing (NLP), such as a word embeddings technique can be used to accurately correlate text with industry taxonomy terms, particularly when the embedding technique is specifically tailored on industry context. Word embedding refers to a collective name for a set of language modeling and feature learning techniques in NLP where words and phrases are mapped to vectors of real numbers.

Further, an E2E deep learning solution can be used to combine the location hypothesis extraction step 101 and location semantic classifier 201 into a single step and without the need to explicitly extract location hypothesis, since engineering documents will provide much labelled data. The location semantic classifier process can also involve subject matter experts' feedback, and the output 206 of the second component 201 can also be used to refine the hypothesis generation as defined in the location hypothesis extraction processing 101 and becomes input data into the third component 301, the location context mining processing.

The Location Context Mining Component

The information generated in the second component 201 is then merged with information collected from other project documents such as BOMs (Bill of Materials), specifications, etc. The location and annotated product documentation output 306 of this third processing component shown in FIG. 7 will further enrich the location information and contextualize the previous processing data to other project information such as scheduling, user company, and job roles and tasks. This third stage processing 301 also involves industry taxonomies and NLP analysis, similar to that described in the second process 201, possibly using different input documentation 302. Processing steps in these documents will also involve PDF corpus conversion 303 and parsing of images, tables, and flows 304.

As previously noted, IBM's SROM analytics solution platform is one possible analytics solution platform that could serve as a platform for the present invention. SROM is one of IBM's third generation analytics that are cloud-based, solution-oriented, function based-APIs (Application Programming Interfaces). SROM was designed by IBM for cross-industry use to address the rapidly evolving solution needs for asset heavy industries such as manufacturing industries, including the electronics, semiconductor, automotive, chemical and petroleum, oil and gas, energy and utility, and mining and metals industries. However, it is again noted that the method of the present invention is not intended to be limited any specific computing platform since the method can be implemented on any platform having the analytic capabilities described herein. Nor is the method intended to be limited to cloud-based platforms as described below, since such analytic capabilities are also possible in non-cloud-based platforms.

This disclosure describes methods and structures for processing construction documents. However, also considered as disclosed herein is a computer product comprising a non-transitory memory device that has embedded therein a set of computer-readable instructions that implement the methods described. Such non-transitory memory devices can include memory devices incorporated in a computing device, such as RAM (Random Access Memory) devices and ROM (Read Only Memory) devices, and used either to store instructions being actively executed by a processor on the computing device or instructions being stored in the computing device as selectively executable. Such non-transitory memory device also include portable memory devices such as plug-in flash memory devices or diskettes that can be inserted into an input port of a computing device.

Although this disclosure includes a detailed description on cloud computing, as follows, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
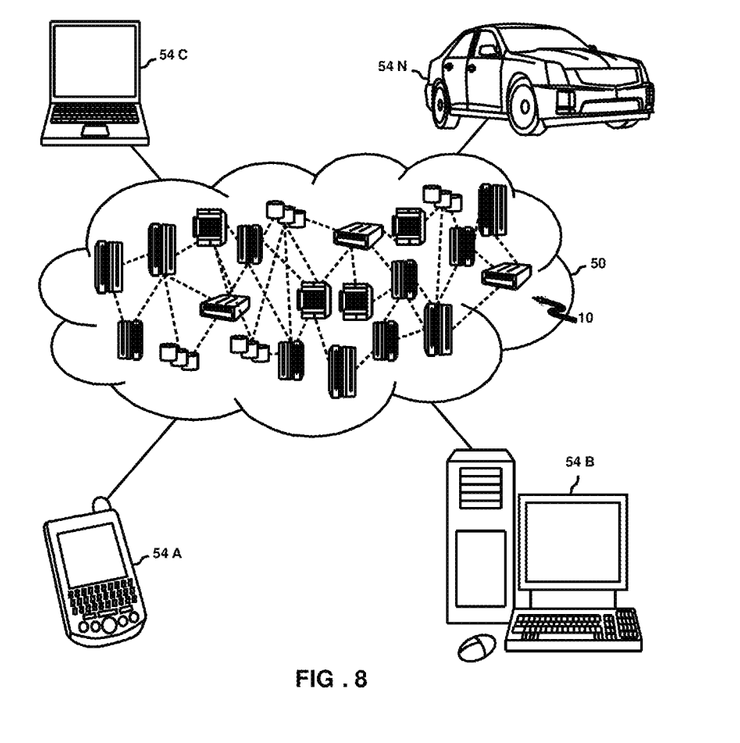
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
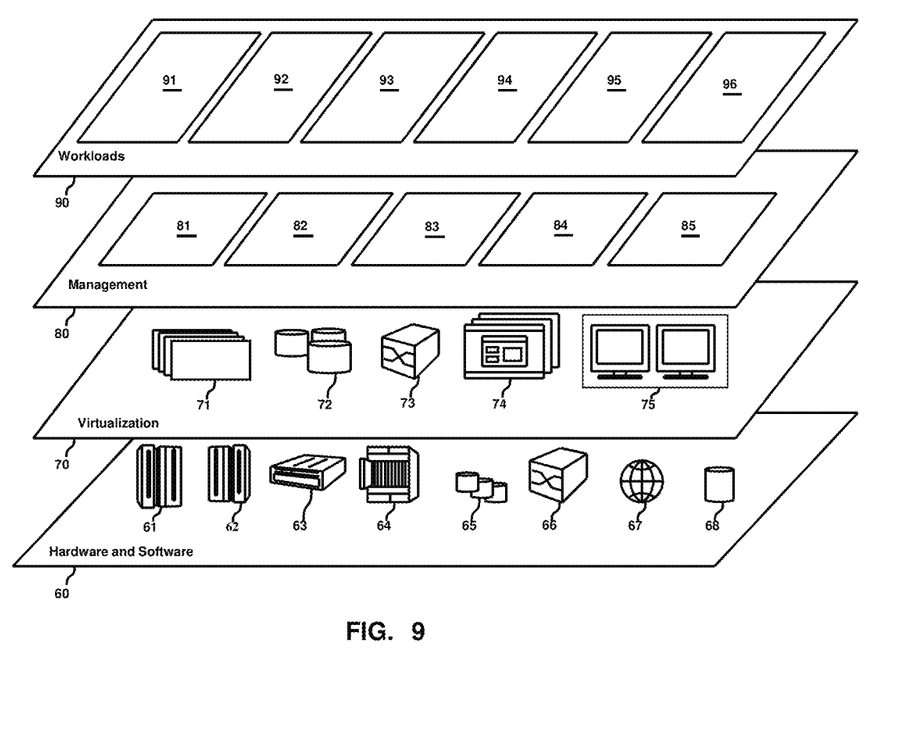
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include tasks related to the implementation of the present invention including the various analytic tools and processes described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of processing construction documentation, the method comprising:
   using at least one industrial standard to develop an ontology and a taxonomy as defining a domain of construction documents to be used for processing a plurality of engineering documents directed to a specific construction project, the ontology comprising a set of concepts and categories in the domain that shows their properties and interrelationships and the taxonomy comprising a common vocabulary to be used for terms found in the plurality of engineering documents directed to the specific construction project;
   receiving an input area that describes where in sample engineering documents to search for location information;
   training a learning model, using a processor on a computer, to extract location information from the input area and context information including semantic information from the sample engineering documents, using the developed ontology and taxonomy such that the extracted context information is semantically related to said taxonomy;
   applying the trained learning model to the plurality of engineering documents directed to the specific construction project, comprising:
      receiving as input data the plurality of engineering documents that comprises a data-dump of one or more three-dimensional (3D) models of the specific construction project and corresponding architecture and an overall layout for the specific construction project; and
      providing the input data to the trained learning model that extracts location information by automatically inferring grid coordinates in the input data even when grid coordinates in an engineering document are obscured by other content in the engineering document, wherein inferring grid coordinates includes interpolating visible information from coordinates mined from drawings of other floors in the plurality of engineering documents;
   upon completion of applying the trained learning model, storing each engineering document in a database of construction documents directed to the specific construction project, each engineering document being stored as annotated with its extracted location information and context information; and
   providing an interface that provides access to the database of construction documents directed to the specific construction project.

2. The method of claim 1, the interface comprising a natural language processing (NLP) that permits a user to query the database of construction documents using a natural language.

3. The method of claim 2, as implemented as a cloud service.

4. The method of claim 1, further comprising:
wherein the extracted location information defines physical locations relevant to the specific construction project;
wherein the extracted context information comprises text extracted from image data of an engineering document; and
wherein extracting the location information and the context information including running analytics on an engineering document at a page-level granularity and extraction from metadata of the engineering document.

5. The method according to claim 4, wherein the receiving as input data the plurality of engineering documents is from physical or virtual resources, the location information includes location hypothesis information, and extracting the context information includes analytics on the location hypothesis information that runs at different level of granularity.

6. The method of claim 4, wherein extracting the location information and the context information further comprising:
using a location hypothesis extraction module to extract location information from engineering documents by analyzing file names, file metadata, and file content to mine the location information and provide a first output to a location semantic classifier;
using a location semantic classifier to semantically correlate the first output from the location hypothesis extraction module with external data sources to provide a second output; and
using location context mining to merge the second output of the location semantic classifier with external documents to provide a third output.

7. The method of claim 4, further comprising applying a natural language processing (NLP) to the extracted location information to semantically correlate the context information with different contexts related to the specific construction project.

8. The method of claim 4, further comprising applying an optical character recognition (OCR) processing for the extracting of the location information and the context information.

9. The method of claim 4, further comprising:
annotating each engineering document with corresponding location information and context information extracted from the engineering document; and
storing each annotated engineering document in the database of construction documents directed to the specific construction project.

10. The method of claim 4, as implemented on an analytics service platform.

11. The method of claim 1, further comprising:
inferring physical locations and context information from the plurality of engineering documents where such information is not available either as metadata or directly accessible from a three-dimensional (3D) model of the specific construction project.

12. The method of claim 1, wherein the learning model is an end-to-end (E2E) analytic algorithm.

13. A computer system comprising:
one or more computer processors;
one or more computer readable memories; and
one or more computer readable storage media;
program instructions, stored on at least one of the one or more computer readable storage media for execution by at least one of the one or more computer processors via at least one of the one or more computer readable memories, to perform the following operations:
using at least one industrial standard to develop an ontology and a taxonomy as defining a domain of construction documents to be used for processing a plurality of engineering documents directed to a specific construction project, the ontology comprising a set of concepts and categories in the domain that shows their properties and interrelationships and the taxonomy comprising a common vocabulary to be used for terms found in the plurality of engineering documents directed to the specific construction project;
receiving an input area that describes where in sample engineering documents to search for location information;
training a learning model to extract location information from the input area and context information including semantic information from the sample engineering documents, using the developed ontology and taxonomy such that the extracted context information is semantically related to said taxonomy;
applying the trained learning model to the plurality of engineering documents directed to the specific construction project, comprising:
receiving as input data the plurality of engineering documents that comprises a data-dump of one or more three-dimensional (3D) models of the specific construction project and corresponding architecture and an overall layout for the specific construction project; and
providing the input data to the trained learning model that extracts location information by automatically inferring grid coordinates in the input data even when grid coordinates in an engineering document are obscured by other content in the engineering document, wherein inferring grid coordinates includes interpolating visible information from coordinates mined from drawings of other floors in the plurality of engineering documents;
upon completion of applying the trained learning model, storing each engineering document in a database of construction documents directed to the specific construction project, each engineering document being stored as annotated with its extracted location information and context information; and
providing an interface that provides access to the database of construction documents directed to the specific construction project.

* * * * *